E. J. McCARTY.
VEHICLE TIRE.
APPLICATION FILED DEC. 12, 1903.

1,039,427.

Patented Sept. 24, 1912.

Witnesses
C. F. Wesson
G. M. Goddard

Inventor:
E. J. McCarty
By his Attorneys
Southgate & Southgate

UNITED STATES PATENT OFFICE.

EUGENE J. McCARTY, OF CLINTON, MASSACHUSETTS, ASSIGNOR TO WALTER R. DAME, TRUSTEE, OF CLINTON, MASSACHUSETTS.

VEHICLE-TIRE.

1,039,427.  Specification of Letters Patent.  Patented Sept. 24, 1912.

Application filed December 12, 1903. Serial No. 184,932.

*To all whom it may concern:*

Be it known that I, EUGENE J. MCCARTY, a citizen of the United States, residing at Clinton, in the county of Worcester and State of Massachusetts, have invented a new and useful Vehicle-Tire, of which the following is a specification.

This invention relates to a tire for use on automobiles, trucks and similar vehicles. The especial object of this invention is to provide a cushioned or springy vehicle tire, which will have superior gripping qualities and which will be more durable and less expensive than the rubber tires now employed for vehicles of the class referred to.

To these ends, this invention consists of a vehicle tire having a wire fabric wearing surface.

Figure 1:
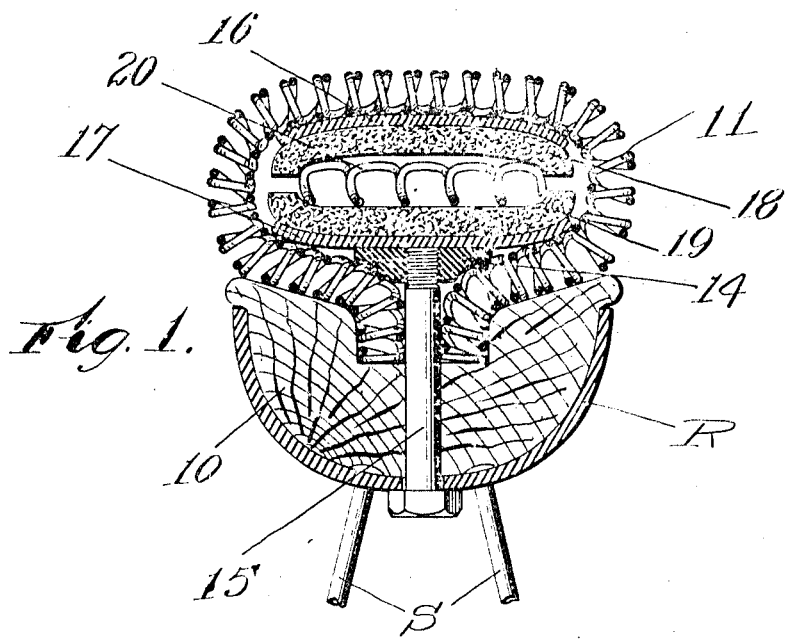
Figure 2:
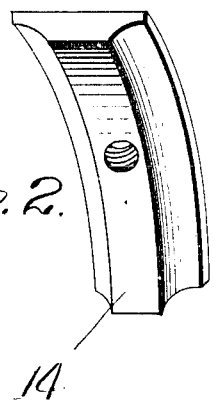
Figure 3:
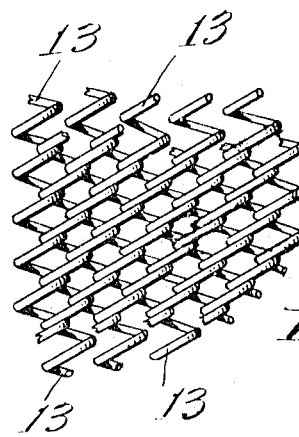
Figure 4:
Figure 5:
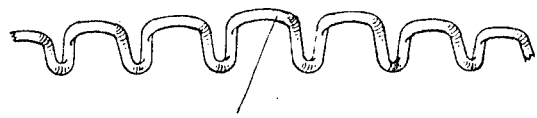

In the accompanying drawing, Figure 1 is a sectional view of sufficient parts of a vehicle wheel to illustrate the application of my invention thereto. Fig. 2 is a perspective view of one of the fastening nuts. Fig. 3 is a fragmentary view of the wire fabric which forms the wearing surface of a tire constructed according to this invention. Fig. 4 is a detail view of the coils or wire spirals which are interlocked to make the fabric which forms the wearing surface of the tire, and Fig. 5 is a similar view showing a slightly modified form of coil.

In practice, I have found that the use of the rubber tires which are now employed for automobiles, trucks, carriages and similar vehicles is both dangerous and expensive. I have found that the use of rubber tires for automobiles or other vehicles is dangerous because of the slipping or "skidding" of such tires when the road-ways are wet; while the use of rubber tires, either of the solid or of the pneumatic tire, is expensive by reason of their first cost and by reason of the frequency with which said tires have to be replaced.

In a tire constructed according to this invention I have provided a construction having a wearing surface which is inexpensive and durable; which has the required amount of elasticity and which is not liable to slip or skid, even when running on slippery and wet pavements.

Referring to the drawing for a detail description of a tire constructed according to this invention, R designates the rim and S designates the spokes of an ordinary vehicle wheel. Fitting into the rim R, I provide wooden blocks 10 having a circumferential groove and clamped into the groove of the blocks 10 are the edges of the woven wire fabric 11 which forms the wearing surface of the tire. This fabric 11, as illustrated most clearly in Fig. 3, consists of interlocked wire coils or spirals 13. These spirals, as shown in Fig. 1, extend around the tire transversely to the major circumference thereof. The edges of the fabric are clamped into the grooves by means of the arc-shaped nuts 14 and bolts 15.

In the center of the tire, I may employ any desired form of elastic or solid cores, for example, as shown, the center of the tire herein illustrated comprises the outside plates 16 and 17 of hoop binding or other sheet metal: the top and bottom plates 18 and 19 of flexible material, and a center of wire fabric 20.

In the use of a tire, as thus constructed, the gripping quality of the wire fabric will prevent the wheel from slipping, thus preventing the loss of power applied to the wheels and avoiding the danger due to the sluing and skidding of the vehicle.

These tires may be manufactured for comparatively small cost, and, in practice, I have found that such tires may be run without renewals for much longer periods than either the ordinary solid or pneumatic tires.

The woven wire fabric itself will provide a considerable amount of spring or elasticity for the tires and such elasticity may be increased to any desired extent by varying the elasticity of the core or center part of the tires.

In the construction shown in Figs. 1, 3 and 4 the loops of the wire spirals 13 are of uniform diameter. In some cases it may be desirable to employ spirals which taper toward their ends, for example, in Fig. 5, 130 designates a wire coil or spiral of this nature which will have its larger loops presented at the tread or contact surface of the tire.

I am aware that changes may be made in practicing this invention by those who are skilled in the art without departing from the scope thereof as expressed in the claims. I do not wish, therefore, to be limited to the construction I have herein shown and described, but What I do claim and desire to secure by Letters Patent of the United States is:—

1. The combination with the rim of a wheel, having a circumferential groove and circumferential bearing surfaces on both sides thereof, of a vehicle tire having a wire fabric wearing surface comprising coils of wire the convolutions of which are arranged substantially perpendicular to the surface of the tire, two plates inside the same a wire spring core between said plates, and means located centrally with respect to the rim and extending to the outside thereof for fastening the edges of said fabric in place around the center of the outer periphery of said rim to produce a flexible connection between said core and the rim.

2. As an article of manufacture, a vehicle tire having a seamless wire fabric wearing surface consisting of coils or spirals of wire arranged transversely to the circumference of the tire, said coils or spirals being interwoven, and an elastic core arranged inside of the same, comprising outside plates and flexible material held between the same.

3. As an article of manufacture, a vehicle tire having a seamless wire fabric wearing surface, consisting of coils or spirals of wire arranged transversely to the circumference of the tire, said coils or spirals being interwoven, and an elastic core arranged inside of the same, comprising outside plates, plates of flexible material, and a center of wire fabric.

4. As an article of manufacture, a vehicle tire having a wearing surface and an elastic core arranged inside the same and comprising a pair of outside plates, a pair of plates of flexible material located between the outside plates and a center of resilient material.

In testimony whereof I have hereunto set my hand, in the presence of two subscribing witnesses.

EUGENE J. McCARTY.

Witnesses:
SYLVIA E. KINNEAR,
HELEN B. CARVILL.